United States Patent
Chen et al.

(10) Patent No.: US 6,788,340 B1
(45) Date of Patent: Sep. 7, 2004

(54) DIGITAL IMAGING CONTROL WITH SELECTIVE INTENSITY RESOLUTION ENHANCEMENT

(75) Inventors: Zhiliang Julian Chen, Plano, TX (US); Eugene G. Dierschke, Dallas, TX (US); Steven Derek Clynes, Allen, TX (US); Anli Liu, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/475,901

(22) Filed: Dec. 30, 1999

Related U.S. Application Data (60) Provisional application No. 60/124,538, filed on Mar. 15, 1999.

(51) Int. Cl.[7] .............................................. H04N 5/235
(52) U.S. Cl. ................................... 348/229.1; 348/243
(58) Field of Search .............................. 348/229.1, 241, 348/243; 396/161, 213, 219; 330/96

(56) References Cited

U.S. PATENT DOCUMENTS

| | | | |
|---|---|---|---|
| 4,860,103 A | | 8/1989 | Azam et al. |
| 5,386,228 A | * | 1/1995 | Okino ..................... 348/218.1 |
| 5,473,375 A | * | 12/1995 | Takayama et al. .......... 348/364 |
| 5,659,355 A | * | 8/1997 | Barron et al. .............. 348/245 |
| 5,691,720 A | * | 11/1997 | Wang et al. ............... 341/143 |
| 5,781,233 A | * | 7/1998 | Liang et al. ............... 348/302 |
| 5,841,385 A | | 11/1998 | Xie |
| 5,986,705 A | * | 11/1999 | Shibuya et al. ............. 348/362 |
| 6,018,269 A | * | 1/2000 | Viswanathan ............... 330/254 |
| 6,049,355 A | | 4/2000 | Kameyama |
| 6,166,766 A | * | 12/2000 | Moore et al. ............... 348/241 |
| 6,246,289 B1 | * | 6/2001 | Pisati et al. ................ 330/254 |
| 6,259,478 B1 | * | 7/2001 | Hori .......................... 348/296 |
| 6,353,401 B1 | * | 3/2002 | Aswell et al. .............. 341/118 |
| 6,549,239 B1 | * | 4/2003 | Tao ............................ 348/371 |
| 6,587,143 B1 | * | 7/2003 | Boisvert .................... 348/241 |
| 6,614,477 B1 | * | 9/2003 | Lee et al. ................... 348/312 |

FOREIGN PATENT DOCUMENTS

| | | |
|---|---|---|
| EP | 0 729 234 A1 | 8/1996 |
| JP | 9-284598 | 10/1997 |

\* cited by examiner

*Primary Examiner*—Wendy R. Garber
*Assistant Examiner*—Matthew L Rosendale
(74) *Attorney, Agent, or Firm*—William B. Kempler; W. James Brady, III; Frederick J. Telecky, Jr.

(57) ABSTRACT

Image enhancement is automatically achieved by calibrating the reference voltage and gain of a differential amplifier and the integration interval so as to provide an input to a differential analog to digital converter (ADC) that utilizes the full dynamic range of the ADC. When used with a CMOS array, the imaging logic can be fabricated on a single chip with the array using combinational logic for fast, inexpensive calibration. Another advantageous feature is the ability to expand a desired portion of the luminance spectrum of the image in order to increase the digital resolution of the resulting image for that portion of the spectrum of interest.

17 Claims, 5 Drawing Sheets

| GAIN FACTOR | GAIN |
|---|---|
| 0 | 1x |
| 1 | 1x |
| 2 | 2x |
| 3 | 4x |
| 4 | 8x |
| 5 | 16x |
| 6 | 16x |
| 7 | 16x |

DIGITAL IMAGING CONTROL WITH SELECTIVE INTENSITY RESOLUTION ENHANCEMENT

This application claims benefit of U.S. Provisional Patent Application No. 60/124,538, filed on Mar. 15, 1999, which application is incorporated herein by reference.

CROSS REFERENCE TO RELATED APPLICATION

This application is related to commonly assigned, co-pending application Ser. No. 09/475,652 entitled Defective Pixel Filtering for Digital filed concurrently herewith and incorporated herein by reference.

FIELD OF THE INVENTION

This invention relates generally to digital imaging devices and specifically to automatic and selective intensity resolution enhancement of a digital image.

BACKGROUND OF THE INVENTION

Digital imaging devices are becoming increasingly popular in a variety of applications, including digital cameras, fingerprint recognition, digital scanners and copiers, and the like. A typical prior art digital imaging devices are based on charge coupled device (CCD) technology. CCD devices have an array of CCD cells, each cell comprising a pixel. Each CCD pixel outputs a voltage signal proportionate to the intensity of light impinging upon the cell. This analog voltage signal can be converted to a digital signal for further processing, digital filtering, storage and the like. As is well known in the art, a two dimensional digital image can be constructed from the voltage signals output from a two-dimensional array of CCD cells, commonly referred to as a sensor array.

Depending upon ambient conditions such as temperature and lighting and the characteristics of the CCD array, the resulting image may have poor resolution. Poor image resolution could result from, very bright light impinging upon sensor array, in which case the resulting image might appear washed out, or low light conditions, in which case the resulting image might appear dark and indistinct. Another contributor to poor image quality might be insufficient contrast between light and dark pixels, resulting in a blurred or faded image. While digital signal processing may be employed to compensate for certain image quality problems, considerable image improvement can be obtained by adjusting how the analog voltage signal coming from the sensor array is handled prior to being input to the analog to digital converter.

The need exists, therefore, for a method of adjusting the digital imaging common technique for improving image resolution is to increase the contrast lighting conditions.

SUMMARY OF THE INVENTION

In one aspect, the present invention provides, a method of automatic gain control in an image processor having a programmable amplifier, the programmable amplifier having a reference voltage input and a signal input and a programmable gain value and having a differential output coupled to an analog to digital converter, the analog to digital converter outputting a digital code corresponding to the output of the programmable amplifier, the method comprising reading a frame of luminance data and determining an average luminance value of the frame and the digital code output by the ADC corresponding to average luminance value. The method further comprises calculating a reference voltage that will cause the digital code output by the ADC to be at a target value when the signal input to the programmable amplifier is set to the average luminance value and a gain that will cause the digital output code of the ADC to be at the target value when the signal input to the programmable amplifier is set to the average luminance value. The method also includes setting the reference voltage and the gain to the calculated values and reading the next frame.

In another aspect, the present invention provides an image processor comprising a differential amplifier receiving as input a luminance signal and a reference voltage signal and outputting an amplified differential signal, a differential analog to digital converter (ADC) receiving as input said amplified differential signal and outputting a digital signal corresponding to said amplified differential signal, a programmable voltage source outputting said reference voltage signal, a digital averager receiving said digital signal and outputting an average luminance value, and a digital signal controller receiving said luminance brightness value and outputting a gain control signal to said differential amplifier and a reference voltage control signal to said programmable voltage source, the gain control signal and the reference voltage control signal being determined from the difference in (i) the digital signal of the analog to digital converter when the luminance input is at the average brightness value and (2) a desired digital signal.

In another aspect, the present invention provides an automatic gain control circuit comprising an amplifier receiving as input a frame of a luminance signal and a reference voltage signal, and outputting a differential signal corresponding to the difference between the luminance signal and the reference voltage signal. The amplifier amplifies the difference under control of a gain control signal. The circuit also includes a differential analog to digital converter (ADC) receiving the signal output by the amplifier and outputting a digital signal corresponding to differential output of the amplifier, means for calculating an average luminance value for the frame, means for comparing the digital signal output by the ADC when the luminance signal input to the amplifier is at the average luminance value to a desired digital output and generating a difference signal, means for adjusting the reference voltage signal in response to the difference signal; and means for adjusting the gain control signal in response to the difference signal.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 1:
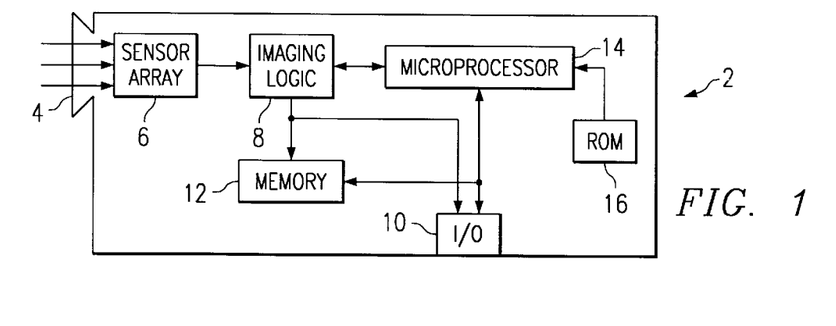
FIG. 1 illustrates a digital imaging device in which preferred embodiments of the invention may be employed.

FIG. 1 illustrates a digital imaging device 2 utilizing preferred embodiments of the present invention. Digital imaging device includes a lens mechanism 4 which receives light emanating or reflected from an object to be imaged and focuses the incoming light upon an array sensor 6. Array sensor 6 is preferably a CMOS sensor array of the type fully described in co-pending patent application Ser. No. 09/223,166, entitled Fast Frame Readout Architecture for Array Sensors with Integrated Correlated Double Sampling System, which application is incorporated herein by reference. As will be known to one in the art, sensor array 6 is comprised of a two dimensional array of CMOS sensors, each sensor corresponding to a pixel of the resulting image. Each sensor outputs an analog voltage signal, which signal is proportionate to the intensity of light impinging upon the particular sensor. The voltage signal from each sensor can be scanned in a raster format as is well known in the art to generate an analog image signal. This analog image signal is fed to imaging logic 8 where the analog signal is buffered and amplified before being converted to a digital signal. The digital signal can be filtered or further processed before being passed to input/output (IO) port 10 in the form of pixel intensity data. Alternatively, with additional signal processing, the digital signal can be output in the form of a bitmap or other well known digital picture format.

Alternatively, the digital signal can be passed to memory 12 for storage. Memory 12 is preferably random access memory or static random access memory. Alternatively, memory 12 could be a magnetic or optical storage device, such as a magnetic diskette device, a CD-ROM, or other storage device. In such case, an appropriate device controller and interface (not shown) would be included along with memory 12. Imaging logic 8, memory 12, and I/O port 10 are preferably under the control of microprocessor 14, which is preferably a general purpose digital microprocessor operating under instructions stored in memory 12 or ROM 16. Stored instructions could also be provided via I/O port 10 directly to microprocessor 14, or stored in memory 12 or ROM 16.

Figure 2:
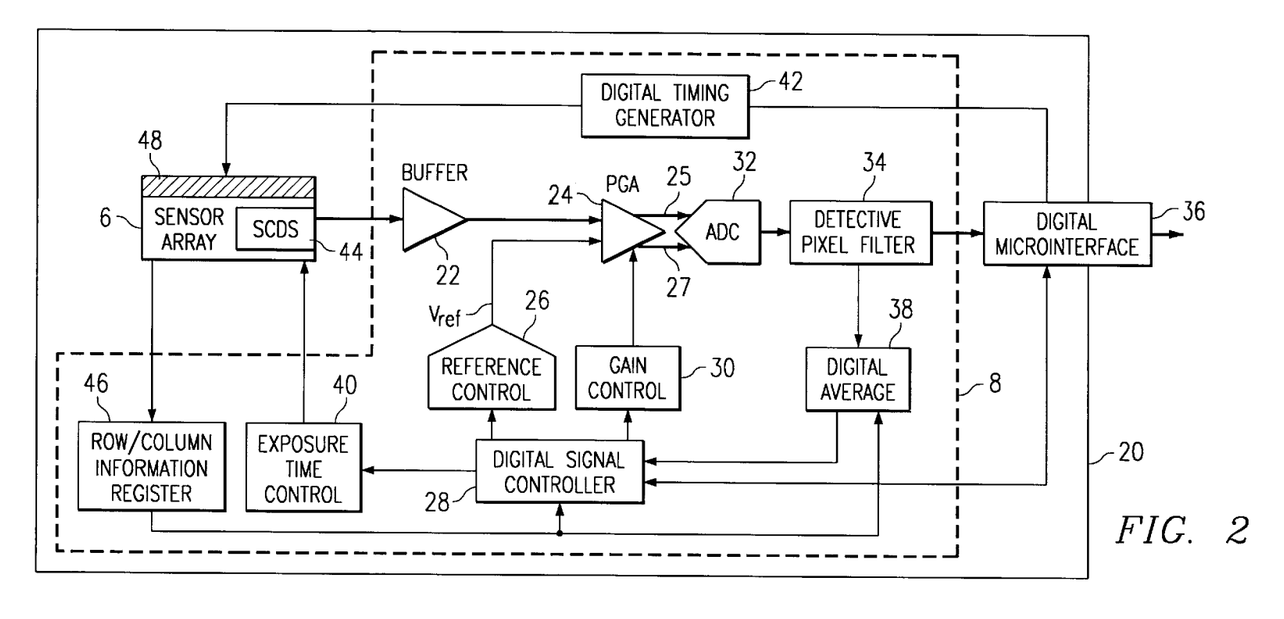
FIG. 2 is a block diagram of a preferred embodiment single chip CMOS imager.

In the preferred embodiment, sensor array 6 is formed of an array of CMOS sensor cells, thus allowing for imaging logic 8 to be formed using CMOS processes on a single integrated circuit along with sensor array 6. FIG. 2 illustrates a single integrated circuit (IC) 20, upon which is realized both sensor array 6 and imaging logic 8 according to the preferred embodiment of the invention. Other features and circuits may be included within IC 20 including internal control registers, microprocessor interface logic, memory interface logic, and the like. These features have not been illustrated as they are not necessary for an understanding of the present invention.

The details of imaging logic 8 will now be described with reference to FIG. 2. The main path for imaging signals is indicated by heavy arrows. The analog signal from sensor array 6 is passed to buffer where the signal is strengthened and fixed pattern noise is removed. From buffer 22 the buffered analog signal is sent to the a first input of programmable gain differential amplifier 24. The second input of amplifier 24 receives a reference voltage, which is fed from reference control block 26 under the control of digital signal controller 28. Amplifier also receives a gain control signal from gain control block 30, which operates under the control of digital signal controller 28.

Amplifier 24 maps the two inputs to a fully differential output 25, 27. In other words, outputs 25 and 27 correspond to the difference between the value of the two input signals (i.e. the analog image signal and the reference voltage $V_{REF}$) multiplied by the gain of amplifier 24 and centered about a common mode voltage level. This fully differential output 25, 27 is then fed to the inputs of differential analog to digital converter (ADC) 32 where the differential value (i.e. the difference between signals 25 and 27) is converted to a digital value. The resulting digital image signal is then passed to defective pixel filter 34 where image errors are detected and corrected, as described in detail in co-pending patent application Ser. No. 09/223,165, entitled Sequential Correlated Double Sampling Technique for CMOS Area Array Sensors, which application is incorporated herein by reference.

The corrected digital image signal is then passed to digital micro-interface 36 which provides an interface between IC 20 and other components of digital imager 2, such as memory 12, microprocessor 14 or I/O port 10.

Also shown in FIG. 2 is digital timing generator 42 which provides timing signals for operation of sequential correlated doubling sampling block 44 in order to suppress CMOS sensor fixed pattern noise. Row/column information register 46 provides information to digital signal controller 28 and digital averager 38 regarding where the signal currently being processed originated on the sensor array (i.e. provides row and column information for each pixel).

Imaging logic 8 also includes a digital signal feedback loop comprising digital average calculator 38, digital signal controller 28, reference control block 26, gain control block 30, and exposure time control 40. This feedback loop is employed to optimize the output of amplifier 24 so as to take advantage of the fully dynamic range of analog to digital converter (ADC) 32. This is accomplished by adjusting either the gain of amplifier 24 or the reference voltage $V_{REF}$ input, or both. Two separate aspects of the image are optimized: optical black calibration ensures that optically black pixels result in a near zero value being output from ADC 32, while ensuring that the full dynamic range of ADC 32 is utilized; and resolution enhancement provides for optimum contrast in the image.

In a first embodiment, image resolution is accomplished automatically via the feedback loop. In an alternate embodiment, a user can select certain values to enhance the image or portion of the image's dynamic range of interest to the user, as will be explained in more detail below.

In automatic operation, three steps are performed on each incoming frame of data. Initially, an optical black calibration is performed on one or more rows of the frame that are known to be optically black. Second, after the full frame has been scanned, the gain and $V_{REF}$ input of amplifier 24 is adjusted in order to map the frame values over the dynamic range of ADC 32. Finally, the integration time, i.e. the frame exposure time, of each succeeding frame is adjusted in order to more closely map the frame values over the dynamic range of ADC 32, if appropriate. Each of these steps will be discussed in more detail below.

Optical Black Calibration

Optical black calibration is accomplished by detecting a signal from pixels (i.e. CMOS sensors) that are known to be "dark," i.e. receiving no light impinging upon them. This is accomplished by the use of light shield 48 over a portion of sensor array 6. In the preferred embodiment, light shield 48 covers the first four rows of pixels, although the number of shielded pixels and rows is a matter of design choice. Because these rows are known dark, the imaging logic can be calibrated to treat these pixels as black, i.e. to have a minimum digital value associated with them. For reasons that will become apparent, this minimum digital value should not be set to zero. In the preferred embodiment, the minimum digital value, corresponding to fully black, or a fully dark pixel, is set to 64.

In order to calibrate to optical black, the reference voltage $V_{REF}$ input to amplifier 24 is adjusted in order to drive the output of ADC to its "black" value, preferably 64. The relationships between $V_{REF}$ and the output of ADC 32 will be described with reference to FIG. 3, which illustrates the relationship between amplifier 24, ADC 32, and reference control block 26.

Figure 3:
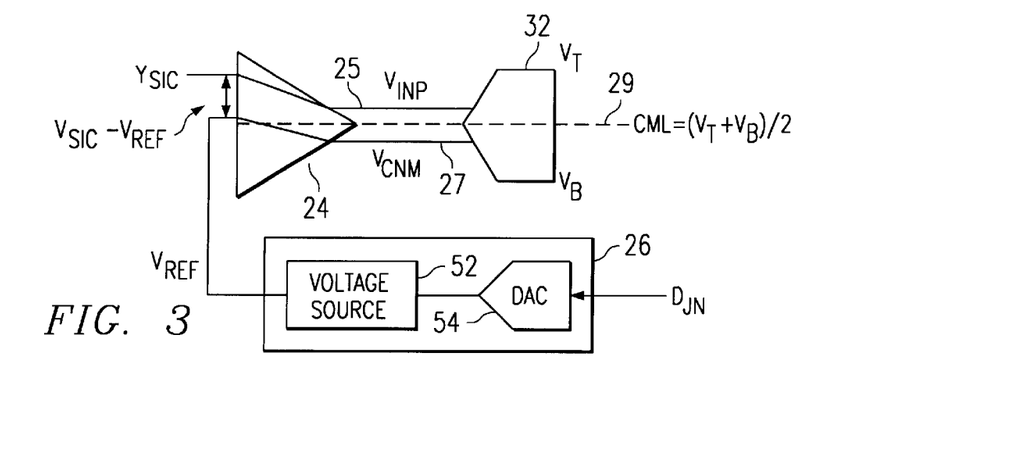
FIG. 3 is a block diagram of a preferred embodiment amplifier and analog to digital converter.

As shown, amplifier 24 receives as input the pixel intensity signal, $V_{sig}$ on its non-inverting input, and the reference voltage signal $V_{REF}$ on its inverting input. Amplifier 24 then outputs a differential signal which is equivalent to the difference between the inputs multiplied by the gain. Amplifier 24 is configured such that the differential output signal 25, 27 is centered about the common mode level (CML) 29 of differential ADC 32. In other words, amplifier 24 maps the difference between its input signals to a differential signal centered about CML. The maximum and minimum operating thresholds of ADC 32 are referred to as $V_T$ and $V_B$ respectively, and CML level 29 is midpoint between $V_T$ and $V_B$.

The transfer equation for amplifier 24 is given by:

$$V_{out}=V_{inp}-V_{inm}=g*(V_{sig}-V_{REF}) \quad (1)$$

where g=the gain of amplifier 24. In the illustrated case, g=1, although amplifier 24 is preferably programmable with a gain value of 2, 4, 8, or 16. Recall from FIG. 3 that the output 25 $V_{inp}$ and 27 $V_{inm}$ is centered about CML, and also recognize that the maximum and minimum thresholds of ADC 32 are centered about CML. Hence:

$$V_{inp}=CML+(V_{inp}-V_{inm})/2. \quad (2)$$

Because the inputs to ADC 32 are symmetrical with respect to CML, the output of ADC 32 can be derived from only one of the input values. In other words, the normalized output of ADC 32 is:

$$D_{outn}=(V_{inp}-V_B)/(V_T-V_B). \quad (3)$$

Preferably the top reference for ADC 32 is chosen as $(V_T-V_B)$ and the bottom reference is chosen as zero. Therefore, equation (3), which is the normalized transfer function of the circuit comprising amplifier 24 and ADC 32, can be rewritten by substituting the values from equations (1) and (2) in the form:

$$D_{outn}=(g*(V_{sig}-V_{REF}))/(2*(V_T-V_B))+\frac{1}{2}. \quad (4)$$

Equation 4 can be employed to force the value $D_{outn}$ to the desired level 64 for a given pixel signal $V_{sig}$ and for a constant gain g, by adjusting the reference voltage input $V_{REF}$ to amplifier 24. As the known black pixels corresponding the pixels beneath shield 48, are being scanned, the appropriate value for $V_{REF}$ is derived.

Also shown in FIG. 3, reference control block 26 includes a variable voltage source 52 and a digital to analog converter (DAC) 54. DAC 54 receives a digital signal, and converts into an analog signal which feeds variable voltage source 52, from which the reference voltage input $V_{REF}$ is generated. The relationship between the normalized output $D_{outn}$ of ADC 32 and the input $D_{inm}$ is given as follows.

For a DAC 54 of size m:

$$V_{REF}=D_{inm}*(VT_{DAC}-VB_{DAC})/(2^m-1) \quad (5)$$

where $D_{inm}$ is the digital input to DAC 54, $VT_{DAC}$ is the top reference for DAC 54, and $VB_{DAC}$ is the bottom reference for DAC 54. DAC 54 is designed to match ADC 32 such that $VT_{DAC}=(V_T-V_B)$ and $VT_{DAC}=0$, so that $$V_{REF}=D_{inm}* (V_T-V_B)/(2^m-1) \quad (6)$$

Equation 6 can be substituted into equation 4, and for a given ADC 32 of size n, the relationship between changes in $D_{outn}$ and $D_{inm}$ is given by $$\text{delta}(D_{outn})=-\text{delta}(g* V_{REF}*(2^n-1)/(2*(V_T-V_B))) \quad (7)$$

which can be simplified and solved for $D_{inm}$ in terms of $D_{outn}$ to yield $$\text{delta}(D_{inm})=-\text{delta}(2/g*D_{outn}*(2^m-1)/(2^n-1)). \quad (8)$$

In the preferred embodiment, ADC 32 is ten bits and DAC 54 is eight bits, resulting in the approximation:

$$\text{delta}(D_{inm})\approx-\text{delta}(D_{outn})/2*g. \quad (9)$$

The relationship of equation 9 allows for fast computation of the required input to DAC 54 in order to generated the required reference voltage $V_{REF}$ for optical black calibration.

Figure 4:
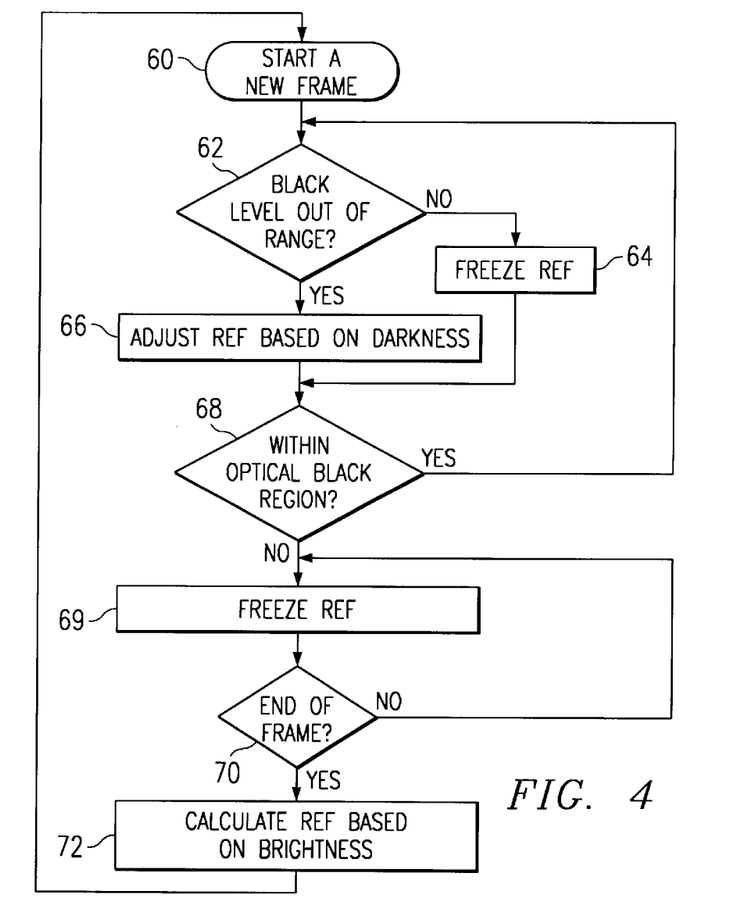
FIG. 4 is a flow chart for reference voltage adjustment.

Further details of the process steps for optical black calibration are provided with reference to FIG. 4. The process begins with the initiation of a new frame at step 60. In decision step 62, the output $D_{out}$ of ADC 32 for a known optically black pixel (i.e. a pixel that is shielded by shield 48) is compared to a threshold value or a threshold range to determine if the output is within the acceptable range for an optically black pixel. Preferably, ADC 32 will output a value of 64 for such a pixel, with a range of plus or minus 10 being allowed. If the output is within the allowed range, then there is no need to adjust the reference voltage $V_{REF}$ input to amplifier 24, so the value for $V_{REF}$ is frozen, as indicated by step 64, and processing proceeds to decision step 68. If, on the other hand, the output of ADC 32 is not within the allowed range, then processing proceeds to step 66 where the value for $V_{REF}$ is adjusted in order to drive the output of ADC 32 to the value 64, as discussed above with reference to equations 4 and 9. Processing then proceeds to decision step 68 where it is determined whether the row being scanned is still within the optical black region. In the preferred embodiments, shield 48 blacks out the first four rows of pixels and information from row/column information register 46 indicates whether the row being scanned is from one of the blacked out rows. If so, the process loops back to decision step 62 for the next row and the loop is repeated until scanning proceeds to a non-blacked out row. If it is determined in decision step 68 that scanning is no longer within the blacked out rows, processing proceeds to step 69. At this point, $V_{REF}$ is frozen and the remainder of the frame rows are scanned and analyzed, until the end of the frame is reached, as indicated by decision step 70. When the end of the frame is reached, processing proceeds to step 72 where $V_{REF}$ is once again adjusted. This time, however, $V_{REF}$ is adjusted, in order to match the characteristics of the entire frame that was just scanned, rather than trying to optimize the optical black value. This is accomplished by determining the average luminance value for the pixels comprising the frame (disregarding the optical black pixels comprising the first four rows), and forcing $V_{REF}$ to a value that will drive the output of ADC 32 to its midpoint value for an input signal $V_{sig}$ corresponding to the calculated average pixel value.

Figure 5A:
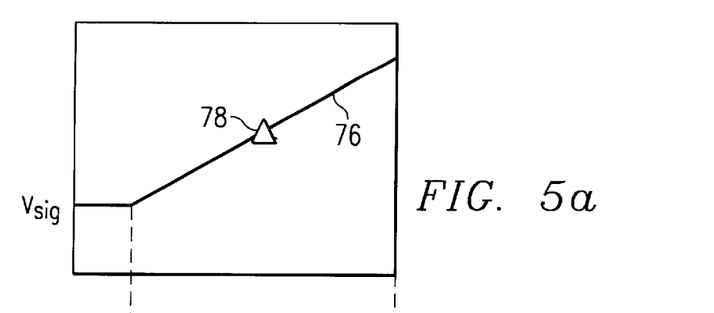
FIG. 5a illustrates the output of a preferred embodiment amplifier.
Figure 5B:
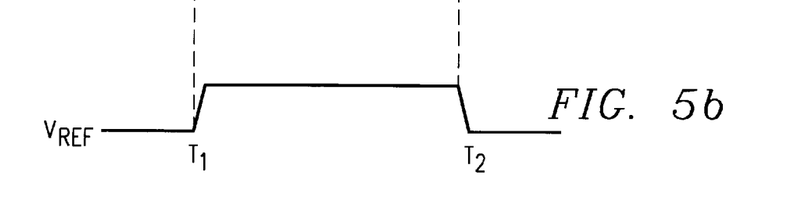
FIG. 5b is a timing diagram for the reference voltage.

This concept is illustrated graphically in FIGS. 5a and 5b. FIG. 5a plots the luminance values for a frame over time. FIG. 5b provides the time chart for $V_{REF}$ during the scan of one frame. The frame shown in 5a is for illustration only and represents a test pattern in which the first four rows of pixels are blacked out (as shown by the flat portion of luminance curve 76) and then the remaining rows increase from black to bright white as the scan proceeds down the frame (as shown by the sloping portion of luminance curve 76). Obviously, in a typical image, the luminance intensity would vary widely and non-linearly, but the principles described herein would apply equally.

As shown in FIG. 5b, the value for $V_{REF}$ is initially set to some default value, preferably the common mode level of ADC 32. After the first four rows have been scanned, a new value for $V_{REF}$ is calculated in step 66 of FIG. 4 and as indicated by the change in the value of $V_{REF}$ at time $t_1$. Alternatively, the value of $V_{REF}$ could be updated after each pixel in the blacked out rows is scanned or at the end of each of the blacked out rows. Note that the latency between the end of the blacked out rows and the calculation of the value for $V_{REF}$ is preferably minimized by the use of the fast computation allowed by equation 9, and because of the use of fast computational logic 8 on the same chip as sensor array 6. Once the value for $V_{REF}$ is determined for the optical black pixels, this value is frozen (step 61 of FIG. 4) and the remainder of the frame is scanned, as indicated between times $T_1$ and $T_2$.

At time $T_2$, the entire frame has been read and a new value for $V_{REF}$ is calculated based upon the actual frame data. The average luminance value for the frame, as shown at point 78 on FIG. 5a, is first calculated. This value is substituted for the value of $V_{sig}$ in equation 4 and $V_{REF}$ is adjusted in order to drive the output of ADC 32 to its mid-range value. For a preferred ten bit ADC, this mid-range value might be set to 512. The mid-range ADC output value $D_{out}$ is preferably a programmable value that can be selected according to the image being scanned and the user's preferences. Empirical evidence suggests that the ADC output value corresponding to the average luminance intensity 78 should be set to about the 75% point of the ADC's range (say 768 for a ten bit ADC) for best image enhancement.

As shown at time $T_2$ in FIG. 5b, $V_{REF}$ is adjusted at the end of the frame (step 72 of FIG. 4) and processing repeats for the next incoming frame of luminance data. Simultaneously with the adjustment of $V_{REF}$ at the end of the frame, the gain of amplifier 24 is also adjusted in order to try to maximize the dynamic range of ADC 32. This is explained in more detail in the following paragraphs.

Optimizing Dynamic Range of ADC

Figure 6A:
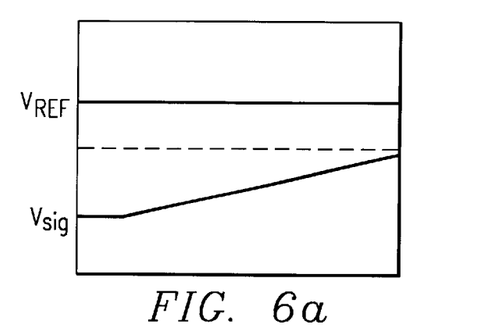
FIGS. 6a through 6d illustrate the output of the preferred embodiment amplifier as the reference voltage and gain are adjusted.
Figure 6B:
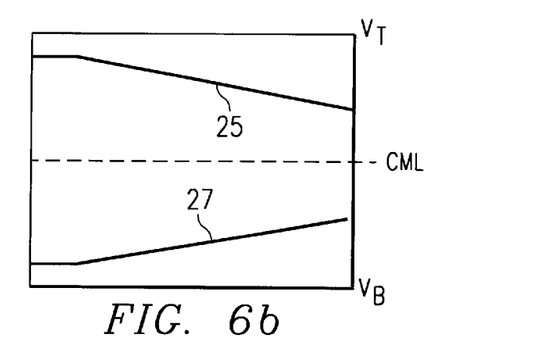

The relationship between amplifier 24 and ADC 32 is further illustrated in FIGS. 6a through 6d. Once again, a test pattern in which the frame gradually and uniformly changes from black to white going from top to bottom (the direction of the scan) will be illustrated. FIG. 6a shows the inputs to amplifier 24 for the scan of one entire frame. FIG. 6b illustrates the corresponding differential output 25, 27 from amplifier 24. Note that $V_{REF}$ is illustrated as having already been adjusted for optical black calibration at the end of the first four rows. Note therefore that the lower component 27 of the differential output signal is at or very near the lower threshold $V_B$ of ADC 32 as indicated. Note also, however, that the differential output signal 25, 27 does not utilize the full range of ADC 32. In order to employ the full range of ADC 32, its inputs (in this case differential output 25, 27 from amplifier 24) must vary across its operating range, i.e. from $V_B$ to $V_T$. In this way, the contrast of the resulting image is enhanced. Additionally, it would be advantageous to calibrate the system such that the average image data is provided at or near the mid-range of the ADC. These advantages are accomplished as follows.

Figure 6C:
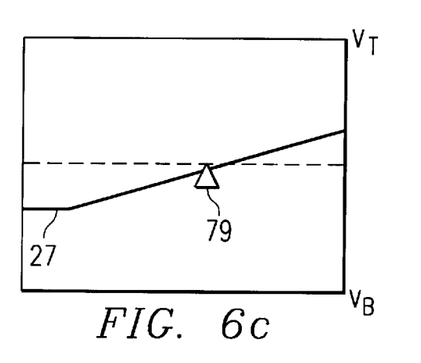

After the frame has been read, the average luminance value for the frame is calculated. This average brightness value 79 is shown in FIG. 6c, which again illustrates the differential output 25, 27 of amplifier 24. Once the average brightness value, or avg_brt, is calculated, $V_{REF}$ can be adjusted such that the output of amplifier 24 will drive ADC 32 to its mid-point range for an incoming luminance value $V_{sig}$ equivalent to the average brightness value. This is illustrated in FIG. 6c where the differential output signal 25, 27 is shown as having been shifted up in order to put the average brightness value at the common mode level, or mid-range level of ADC 32 (for clarity only one component 27 of differential output signal 25, 27 is illustrated). Preferably, differential output signal 25, 27 will be shifted up in order to bring the average brightness value to about 75% of $V_T$. In this way, the brighter portions of the image, which are typically the areas of most interest, will be enhanced. In other alternatives, the average brightness value could be shifted to anywhere within the range of ADC 32. This variability is accomplished by the use of user programmable registers. Note that FIG. 6c is illustrative only and does not correspond to actual output signals from amplifier 24. The drawing merely illustrates the intended result (for the next frame of data) of adjusting $V_{REF}$ after the first frame has been read.

Figure 6D:
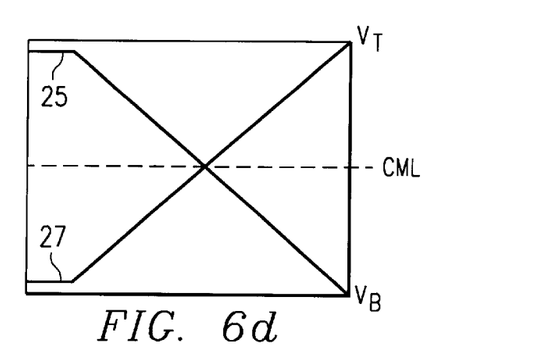

The differential output signal 25, 27 is expanded to extend across the full range of ADC 32 (or as much is practical) by increasing the gain of amplifier 24. This increase in gain will adjust the slope of differential output 25, 27, as shown in FIG. 6d. FIG. 7 provides additional details regarding the gain adjustment.

Figure 7A:
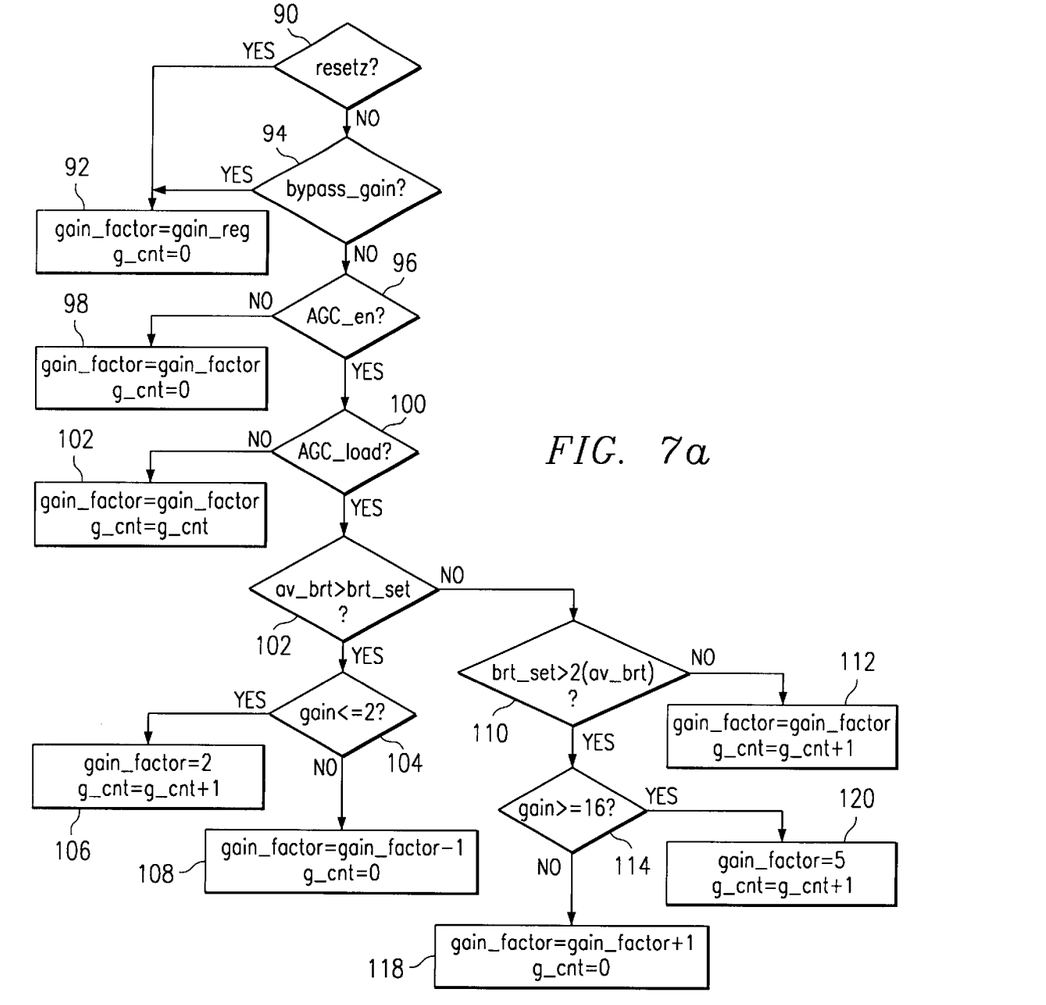
FIG. 7a is a flow chart for gain adjustment.
Figure 7B:
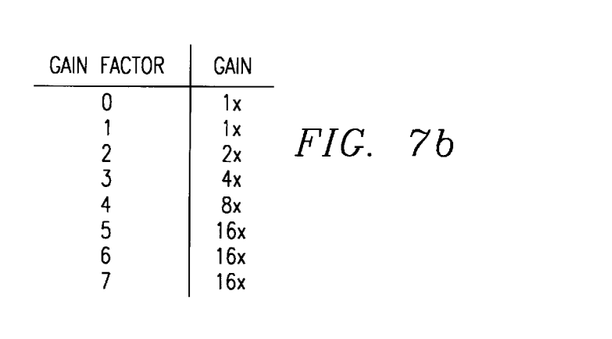
FIG. 7b illustrates the relationship between the gain factor and the programmable gain of the preferred embodiment amplifier.

FIG. 7a is a flow chart illustrating the method of adjusting the gain of amplifier 24 in order to match its differential output 25, 27 to the range of ADC 32 for the luminance signal of the last scanned frame. It is expected that the next frame will be similar in luminance values and hence its contrast will be improved by using the gain calculated for the immediately preceding frame. In a first decision step 90, it is determined whether a chip reset has occurred. If so, the process proceeds to step 92 where a gain factor gain is set to a value stored in a register or other memory source. The gain factor is a three bit value, i.e. 0 through 7, that corresponds to the gain of amplifier 24 as shown in FIG. 3b. In preferred embodiments, amplifier 24 can impose a gain of 1X, 2X, 4X, 8X, or 16X. If a chip reset has not occurred, the process proceeds to step 94 where it is determined whether the imaging logic is operating in user controlled mode, i.e. the automatic image enhancement features have been disabled. In that case, processing proceeds to step 92 where the gain factor is set to a value stored in a register or other memory source. Note that the value can be a preprogrammed default value or can be a value input by the user of the system.

Assuming automatic gain is not disabled by the user, processing continues to decision step 96 where it is determined whether the automatic gain control feature has been temporarily disabled by the system to allow the system time to stabilize after the integration interval has been adjusted. If so, the gain factor is not changed and processing discontinues, as shown in block 98. If automatic gain control is enabled, processing continues to decision step 100 where it is determined if an entire frame has been scanned. If not, the gain factor is unchanged, as shown in step 102. If the end of the frame has been reached, as may be indicated by an end of frame signal from Row Column Information Register 45, the processing proceeds to decision step 104 where the average brightness value is calculated. This average brightness value is then compared to a pre-set threshold value. As discussed above, this pre-set threshold value could correspond to the mid-range of ADC 32 or more preferably to the 75% range.

If the average brightness value is greater than the pre-set threshold value, this indicates that the image is too bright, and the gain should be adjusted downwards. In decision step 104, it is determined whether the gain factor is less than or equal to two, corresponding to the minimum gain value of 2X. If the gain factor is greater than 2, indicating that the gain of amplifier 24 can be adjusted down, processing continues to step 108 where the gain factor is decremented by one. By reference to FIG. 7b it is seen that decrementing the gain factor will cause the gain of amplifier 24 to be cut in half (assuming the gain factor is at 3, 4, or 5).

On the other hand, if it is determined in decision step 102 that the average brightness is below the threshold value, a second decision step 110 is reached. In decision step 110, it is determined if the threshold value is more than twice as great as the average brightness value. Recall that the gain of amplifier 24 can only be adjusted in multiples of two. Therefore, if the threshold brightness value is not more than twice the current average brightness, there is no reason to double the gain, and hence the gain factor remains unchanged, as shown in step 112. On the other hand, if the gain can be doubled (i.e. the threshold value is greater than twice the average brightness) processing continues to decision step 114 where it is determined if the gain is already at its maximum gain value of 16 (recall that amplifier 24 is limited to a maximum gain of 16). If the gain is not already at its maximum, the gain factor is incremented by one in step 118. If the gain is already at its maximum, the gain factor is set to five. This keeps the gain at its maximum, while also allowing the gain to be halved to eight in one step, if the next frame image is much brighter (i.e. if the process flows to step 108 when calculating the gain for the next frame).

As stated above, the gain of amplifier 24 can only be adjusted in multiplies of two. More precise adjustment in matching the dynamic range of ADC 32 can be obtained by adjusting the integration time, i.e. the exposure time for each frame. As the integration time increases, the incoming pixel signal $V_{sig}$ increases proportionately. From the perspective of the ADC inputs, this is equivalent to increasing the gain of amplifier 24. The integration time can be adjusted in much finer increments than doubling or halving, however. In the preferred embodiments, a five bit integration factor is employed, corresponding to a value of 0 through 31. Therefore, the integration period can be adjusted in increments of $\frac{1}{32}^{nd}$ of a frame period. The frame period is preferably a programmable value. Preferably the frame period is programmable from 3 frames per second to 100 frames per second or more. In the preferred embodiment, the default value is 30 frames per second.

Figure 8:
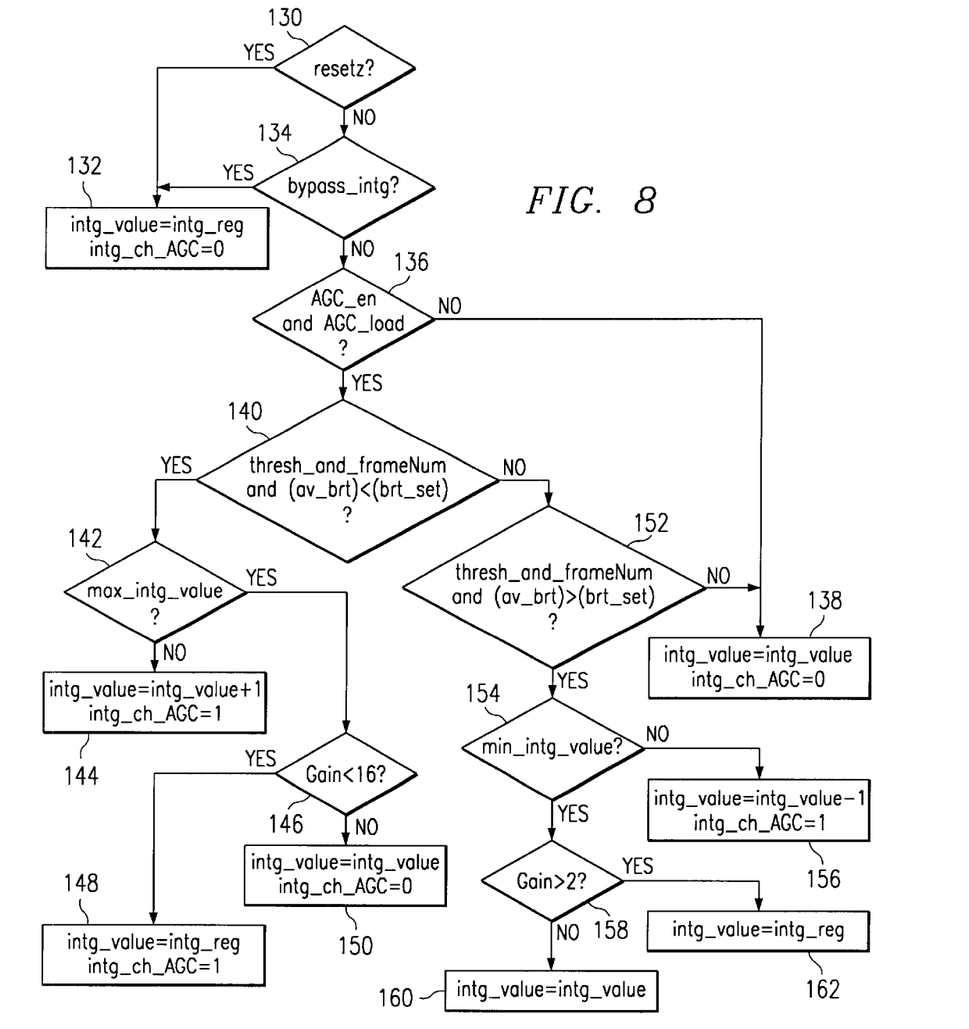
FIG. 8 is a flow chart for adjusting the integration interval.

FIG. 8 provides a flow chart illustrating a preferred process for adjusting the integration interval. In the preferred embodiment, this adjustment is made immediately subsequent to the gain adjustment illustrated in FIG. 7a. In a first decision step 130, it is determined whether the system has been reset. If so, the integration factor value is retrieved from an integration interval register. In the preferred embodiment, the integration interval value is set to 16 by default. Likewise, if it is determined in decision step 134 that automatic integration time control has been bypassed by the user, the value is retrieved from the integration interval register as per step 132.

In decision step 136, it is determined whether automatic gain control is enabled (or whether it has been enabled in order to allow the system time to stabilize since the integration interval was last adjusted) and whether the end of the frame has been reached. If not, the integration value remains unchanged as shown in step 138. Otherwise, processing continues to decision step 140 where the average brightness value is compared to the threshold value. If the threshold value is greater than the average brightness, indicating that the integration interval should be increased, processing continues to decision step 142 where it is determined whether the integration interval is already at its maximum value. If not, the integration value is incremented by one, thus increasing the integration interval for the next frame, as shown by step 144.

If the integration value is at its maximum, the gain value for amplifier 24 is checked in decision step 146. If the gain value is less than sixteen, indicating that the gain can be adjusted, then the integration value from the integration interval register is restored, as per step 148. The reason for this is that if the integration interval is at its maximum, but the gain value is not, the gain value can be doubled after the next frame. If the integration value were left at its maximum value, it is likely that doubling the gain in the next frame would overshoot the desired threshold value. On the other hand, if the gain value is already at its maximum, then processing proceeds to step 150 and the integration value is left at its maximum. This represents the situation where the image is quite dark, and the gain and integration values have been adjusted as high as the system will allow.

Returning to decision step 140, if the average brightness value is not less than the threshold value, this indicates that the integration interval may need to be decremented. Processing proceeds to step where it is determined whether the average brightness is greater than the threshold value. If the result of this step is no, this indicates that the average brightness is equal to the threshold (because both decisions 140 and 152 result in a no), and the integration value remains unchanged, as indicated by step 138. On the other hand, if the average brightness value is greater than the threshold value (indicating a need to decrement the integration interval value), processing proceeds to decision step 154 to determine whether the integration interval is already at its minimum value. If not, than the integration value is decremented in step 156.

If the integration interval is already at its minimum value, processing proceeds to decision step 158 where it is determined whether the gain of amplifier 24 is at its minimum. As was discussed above with reference to step 146, if the integration value is already at its endpoint, the gain can perhaps be further adjusted. If the gain is also already at its minimum, however, indicating that no further adjustment can be made, the integration interval remains unchanged, as indicated by step 160. If the gain is above its minimum value, indicating that further adjustment can be made, the integration interval value stored in the integration interval register is loaded, step 162, with the expectation that the gain value will be halved at the end of the subsequent frame.

FIG. 6d illustrates the ideal differential output 25, 27 of amplifier 24 after adjustment of $H_{REF}$, the gain of amplifier 24, and the integration interval. In actuality, the frame under consideration will have already passed through ADC 32 by the time the new reference voltage, gain, and integration interval are calculated. In most instances, however, the subsequent frame will be similar and hence the adjusted values will provide the best possible resolution.

Selective Intensity Resolution Enhancement

Figure 9A:
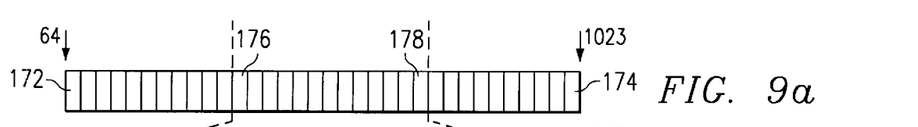
FIGS. 9a and 9b illustrate a full luminance spectrum for a an image and a portion of the luminance spectrum of interest being expanded across the dynamic range of the preferred embodiment analog to digital converter, respectively.
Figure 9B:
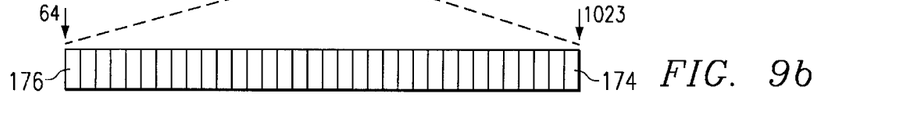

FIGS. 9a and 9b illustrate a further advantageous feature of the preferred embodiments. Selective intensity resolution enhancement allows an end user to specify a portion of the luminance range for enhancement. In FIG. 9a, the typical intensity response of the system is shown. Optically black pixels 170 result in a minimum code being output from ADC 32 (say 64 in the preferred embodiments) whereas fully lit pixels result in a maximum code being output (1024 in the case of a ten bit ADC). Between the darkest pixels and the lightest pixels, ADC 32 provides 1024 increments of intensity variation.

Assume for a moment, that only a certain portion of the intensity spectrum is of interest to the user, however. As an example, consider an image of an illuminated light bulb on a dark surface. The luminance value of the brightest pixels that will be coded to the maximum code (1023) may be many orders of magnitude greater than the luminance value for the darkest pixels in the image the will be coded to the minimum code (62). Because of the wide variations in luminance value that will be digitized to one of 1024 values, much of the detail in the image will necessarily be lost.

Assume that only a portion of the actual image is of interest, however, such as the filament of the light bulb. Obviously, the pixels associated with the filament are going to be centered about the high end of the luminance spectrum, such as the portion of the spectrum bounded by pixels 176 and 178 in FIG. 9a. This portion of the spectrum might be coded into perhaps only 500, or 300 or perhaps fewer digital increments.

In FIG. 9b, the desired portion of the spectrum has been expanded to occupy the full range of ADC output codes, from 64 to 1023. Bordering pixel 176 now results in a minimum output code and border pixel 178 now results in a maximum output code. Therefore, this portion of the overall spectrum is now represented by a full 1024 digital levels, as opposed to 500, 300 or fewer levels in the original image. As will be apparent from FIG. 9b, any pixel with an luminance value of less than that for pixel 176 will appear as black and any pixel with a luminance value of greater than that for pixel 178 will appear as bright white. Therefore, no details or resolution will appear outside of the portion of the luminance spectrum defined by pixels 176 and 178.

The automatic gain control and optical black calibration discussed above must be disabled in order to realize this advantageous feature. By adjusting $V_{REF}$ so that ADC 32 outputs the minimum code (say 64) when the incoming pixel signal $V_{sig}$ has the value of pixel 176, the lower boundary for the desired portion of the spectrum can be defined. The gain, integration time, and reference voltage are then manually adjusted by the user to bring the luminance range between pixels 176 and 178 to map to the fully dynamic range of ADC 32.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For instance, while the preferred embodiment circuits and system are implemented in combination logic using CMOS fabrication processes, other fabrication processes are clearly contemplated. Additionally, the described functionality could be realized using a general purpose microprocessor or digital signal processor running instructions stored in memory. One skilled in the art will recognize that the teachings contained herein apply equally to monochrome and color image processing, as well as to still imaging and video imaging. The described functions could be performed on a frame by frame basis, or alternatively could be performed only on selected frames, or on portions of all or selected frames. Various other modifications and embodiments will be apparent to one skilled in the art. It is therefore intended that the appended claims encompass any such modifications or embodiments.

What is claimed is:

1. A method of automatic gain control in an image processor having a programmable amplifier, the programmable amplifier having a reference voltage input and a signal input and a programmable gain value and having a differential output coupled to an analog to digital converter (ADC), the analog to digital converter outputting a digital code corresponding to the output of the programmable amplifier, the method comprising:

reading a frame of luminance data, determining an average luminance value of the frame and the digital code output by the ADC corresponding to average luminance value;

calculating a reference voltage that will cause the digital code output by the ADC to be at a target value when the input to the programmable amplifier is set to the average luminance value;

calculating a gain that will cause the digital code output by the ADC to be at the target value when the input to the programmable amplifier is set to the average luminance value;

setting the reference voltage and the gain to the calculated values and reading the next frame; wherein the gain is calculated from the difference in (1) the digital code output by the ADC when the signal input to the programmable amplifier is set to the average luminance value, and (2) a pre-determined digital code output by the ADC.

2. The method of claim 1 further comprising:

reading an optically black portion of the frame in which the luminance value is at a known luminance reference value; and calculating a reference voltage that will cause the output of the ADC to be at a desired minimum value when the input signal to the programmable amplifier is set to the known reference value.

3. The method of claim 2 wherein the steps occur automatically at the start of each frame.

4. The method of claim 1 wherein the steps of determining an average luminance value, calculating a reference voltage, calculating a gain, and setting the reference voltage and the gain to the calculated values occur automatically after each frame is read.

5. The method of claim 1 wherein the pre-determined output of the ADC is the mid-point of a range of ADC output values.

6. The method of claim 1 wherein the pre-determined output of the ADC is 75% of a maximum ADC output value.

7. An image processor comprising:
- a differential amplifier receiving as input a luminance signal and a reference voltage signal and outputting an amplified differential signal;
- a differential analog to digital converter (ADC) receiving as input said amplified differential signal and outputting a digital signal corresponding to said amplified differential signal;
- a programmable voltage source outputting said reference voltage signal;
- a digital averager receiving said digital signal and outputting an average luminance value;
- a digital signal controller receiving said average luminance value and outputting a gain control signal to said differential amplifier and a reference voltage control signal to said programmable voltage source, the gain control signal and the reference voltage control signal being determined from the difference in (1) the digital signal of the analog to digital converter when the luminance input is at the average brightness value and (2) a desired digital signal.

8. The image processor of claim 7 wherein the reference voltage control signal is calculated from the output of the differential analog to digital converter by the equation delta($D_{inm}$)≈−delta($D_{outm}$)/2*g, wherein delta($D_{inm}$) is the change in the input to a digital to analog converter controlling the programmable voltage source, delta($D_{outm}$) is the change in the output of the analog to digital converter, and g is the gain of the differential amplifier.

9. The image processor of claim 7 wherein the amplified differential signal of the programmable amplifier is connected directly to the differential analog to digital converter.

10. The image processor of claim 7 wherein the digital signal output by the differential analog to digital converter has a maximum and a minimum value and the desired digital signal is mid-point between the maximum and minimum values.

11. The image processor of claim 7 wherein the digital signal output by the differential analog to digital converter has a maximum and a minimum value and the desired digital signal is about 75% of the maximum value.

12. The image processor of claim 7 wherein the image processor is realized in combinational logic.

13. The image processor of claim 7 wherein the gain is adjusted in multiples of two.

14. The image processor of claim 7 further comprising an integration interval calculation circuit wherein an integration interval is calculated from the difference in (1) the digital signal of the analog to digital converter when the luminance input is at the average luminance value and (2) the desired digital signal.

15. The image processor of claim 7 wherein the digital signal controller further outputs a second reference voltage control signal to said programmable voltage source, the second reference voltage control signal being determined so as to drive the output of the analog to digital converter to a desired minimum value when the luminance signal input to the differential amplifier is at optical black.

16. The image processor of claim 12 wherein the combinational logic operates in real time.

17. An automatic gain control circuit comprising:
- an amplifier receiving as input a frame of a luminance signal and a reference voltage signal, and outputting a differential signal corresponding to the difference between the luminance signal and the reference voltage signal, the amplifier amplifying the difference under control of a gain control signal;
- a differential analog to digital converter (ADC) receiving the signal output by the amplifier and outputting a digital signal corresponding to differential output of the amplifier;
- means for calculating an average luminance value for the frame;
- means for comparing the digital signal output by the ADC when the luminance signal input to the amplifier is at the average luminance value to a desired digital output and generating a difference signal;
- means for adjusting the reference voltage signal in response to the difference signal; and
- means for adjusting the gain control signal in response to the difference signal;
- further including means for manually and independently adjusting the reference voltage signal, the gain, and the integration interval.

* * * * *